US012746552B2

(12) United States Patent
Barin et al.

(10) Patent No.: US 12,746,552 B2
(45) Date of Patent: Sep. 29, 2026

(54) METHODS FOR THE DESTRUCTION OF POLYFLUORINATED ORGANIC COMPOUNDS

(71) Applicant: CycloPure, Inc., Chicago, IL (US)

(72) Inventors: Gokhan Barin, Wilmette, IL (US); Olivia Therese Teodoro, Chicago, IL (US); Edon Vitaku, Marlborough, MA (US)

(73) Assignee: CycloPure, Inc., Chicago, IL (US)

( * ) Notice: Subject to any disclaimer, the term of this patent is extended or adjusted under 35 U.S.C. 154(b) by 176 days.

(21) Appl. No.: 18/896,201

(22) Filed: Sep. 25, 2024

(65) Prior Publication Data

US 2025/0099969 A1 Mar. 27, 2025

Related U.S. Application Data

(60) Provisional application No. 63/585,442, filed on Sep. 26, 2023.

(51) Int. Cl.
*B02C 15/00* (2006.01)
*B02C 19/00* (2006.01)

(52) U.S. Cl.
CPC .......... *B02C 15/00* (2013.01); *B02C 19/0056* (2013.01)

(58) Field of Classification Search
CPC ................................ B02C 15/00; B02C 17/00
See application file for complete search history.

(56) References Cited

U.S. PATENT DOCUMENTS

| | | | |
|---|---|---|---|
| 3,426,011 | A | 2/1969 | Parmerter et al. |
| 3,453,257 | A | 7/1969 | Parmerter et al. |
| 3,453,258 | A | 7/1969 | Parmerter et al. |
| 3,453,259 | A | 7/1969 | Parmerter et al. |
| 3,453,260 | A | 7/1969 | Parmerter et al. |
| 3,459,731 | A | 8/1969 | Gramera et al. |
| 3,553,191 | A | 1/1971 | Parmerter et al. |
| 3,565,887 | A | 2/1971 | Parmerter et al. |
| 4,535,152 | A | 8/1985 | Szejtli et al. |
| 4,565,727 | A | 1/1986 | Giglia et al. |
| 4,616,008 | A | 10/1986 | Hirai et al. |
| 4,638,058 | A | 1/1987 | Brandt et al. |
| 4,678,598 | A | 7/1987 | Ogino et al. |
| 4,746,734 | A | 5/1988 | Tsuchiyama et al. |
| 5,183,809 | A | 2/1993 | Weisz et al. |
| 5,262,404 | A | 11/1993 | Weisz et al. |

(Continued)

FOREIGN PATENT DOCUMENTS

| | | | |
|---|---|---|---|
| CN | 1352199 | A | 6/2002 |
| CN | 1658888 | A | 8/2005 |

(Continued)

OTHER PUBLICATIONS

Alsbaiee et al., Rapid removal of organic micropollutants from water by a porous beta-cyclodextrin polymer; Nature vol. 529:190-194. (Dec. 21, 2015).

(Continued)

*Primary Examiner* — Matthew Katcoff
(74) *Attorney, Agent, or Firm* — COOLEY LLP

(57) ABSTRACT

Methods for decomposing PFAS in a solid are provided. The method comprises combining a solid comprising PFAS with a co-milling agent to form a mixture of PFAS and the co-milling agent, and milling the mixture in a ball mill.

21 Claims, 10 Drawing Sheets

(56) References Cited

U.S. PATENT DOCUMENTS

| | | | | |
|---|---|---|---|---|
| 5,488,021 | A | 1/1996 | DeLiso et al. | |
| 5,496,649 | A | 3/1996 | Mallory et al. | |
| 6,444,723 | B1 | 9/2002 | Kline | |
| 6,814,319 | B2 * | 11/2004 | Haskell | B02C 17/20 241/21 |
| 6,881,712 | B2 | 4/2005 | Angell et al. | |
| 7,237,732 | B2 * | 7/2007 | Sawada | B02C 19/068 241/38 |
| 9,624,314 | B2 | 4/2017 | Dichtel et al. | |
| 9,828,458 | B2 | 11/2017 | Suri et al. | |
| 10,287,185 | B2 | 5/2019 | Nickelsen et al. | |
| 11,001,645 | B2 | 5/2021 | Barin et al. | |
| 11,155,646 | B2 | 10/2021 | Barin et al. | |
| 11,512,146 | B2 | 11/2022 | Barin et al. | |
| 11,965,042 | B2 | 4/2024 | Barin et al. | |
| 2001/0008222 | A1 | 7/2001 | Ma et al. | |
| 2005/0154198 | A1 | 7/2005 | Trotta et al. | |
| 2005/0262646 | A1 | 12/2005 | Berlinger | |
| 2006/0067965 | A1 | 3/2006 | Chandra et al. | |
| 2010/0311905 | A1 | 12/2010 | Mentink et al. | |
| 2014/0178457 | A1 | 6/2014 | Travaglini et al. | |
| 2015/0004389 | A1 | 1/2015 | Corinti et al. | |
| 2015/0112050 | A1 | 4/2015 | Sakata et al. | |
| 2015/0273389 | A1 | 10/2015 | Liu et al. | |
| 2015/0361595 | A1 | 12/2015 | Keane et al. | |
| 2016/0304630 | A1 | 10/2016 | Dichtel et al. | |
| 2016/0370357 | A1 | 12/2016 | Lucas et al. | |
| 2017/0173560 | A1 | 6/2017 | Dichtel et al. | |
| 2017/0222458 | A1 | 8/2017 | Chang et al. | |
| 2018/0186939 | A1 | 7/2018 | Blanchemain et al. | |
| 2019/0015814 | A1 | 1/2019 | Trabolsi et al. | |
| 2019/0375858 | A1 | 12/2019 | Xie et al. | |
| 2020/0071530 | A1 | 3/2020 | Birkeland | |
| 2020/0262936 | A1 | 8/2020 | Barin et al. | |
| 2020/0306726 | A1 | 10/2020 | James et al. | |
| 2020/0398252 | A1 | 12/2020 | Ma et al. | |
| 2021/0163631 | A1 | 6/2021 | Barin et al. | |
| 2022/0017645 | A1 | 1/2022 | Barin et al. | |
| 2023/0097058 | A1 | 3/2023 | Whitehill et al. | |
| 2023/0279158 | A1 | 9/2023 | Barin et al. | |
| 2024/0238761 | A1 | 7/2024 | Ling et al. | |
| 2024/0293801 | A1 | 9/2024 | Ling et al. | |

FOREIGN PATENT DOCUMENTS

| | | | |
|---|---|---|---|
| CN | 101733009 | A | 6/2010 |
| CN | 102659206 | A | 9/2012 |
| CN | 107376875 | A | 11/2017 |
| CN | 107709251 | A | 2/2018 |
| CN | 107709441 | A | 2/2018 |
| CN | 108554387 | A | 9/2018 |
| CN | 108579689 | A | 9/2018 |
| CN | 109046280 | A | 12/2018 |
| CN | 109053932 | A | 12/2018 |
| JP | 2005125193 | A | 5/2005 |
| JP | 2006083379 | A | 3/2006 |
| JP | 2010119389 | A | 6/2010 |
| JP | 2013233473 | A | 11/2013 |
| JP | 2019218535 | A | 12/2019 |
| KR | 20100122880 | A | 11/2010 |
| WO | WO-2012090018 | A1 | 7/2012 |
| WO | WO-2016172118 | A1 | 10/2016 |
| WO | WO-2018200857 | A1 | 11/2018 |
| WO | WO-2020073674 | A1 | 4/2020 |
| WO | WO-2020167375 | A1 | 8/2020 |
| WO | WO-2022018472 | A1 | 1/2022 |
| WO | WO-2022104255 | A1 | 5/2022 |
| WO | WO-2023107629 | A1 | 6/2023 |

OTHER PUBLICATIONS

Alzate-Sanchez et al. "Cotton Fabric Functionalized with a—Cyclodextrin Polymer Captures Organic Pollutants from Contaminated Air and Water," Chem. Mater. 28:8340-8346 (2016).

Anne, J.M., et al., "β-Cyclodextrin Conjugated Bifunctional Isocyanate Linker Polymer for Enhanced Removal of 2,4-Dinitrophenol from Environmental Waters," Royal Society Open Science, vol. 5, 180942, 22 pages (2018).

Barry et al., "Perfluorooctanoic Acid (PFOA) Exposures and Incident Cancers Among Adults Living Near a Chemical Plant," Environ. Health Perspect. 121(11-12):1313-1318 (2013).

Barzen-Hanson et al., "Discovery of 40 Classes of Per- And Polyfluoroalkyl Substances in Historical Aqueous Film-Forming Foams (AFFFs) and AFFF-Impacted Groundwater," Environ. Sci. Technol. 51:2047-2057 (2017).

Berto S., et al, "Synthesis of new iconic β-cyclodextrin polymers and characterization of their heavy metals retentions," Journal of Inclusion Phenomena and Macrocyclic Chemistry 57:631-636 (2007).

Boyer, T.H., et al., "Life Cycle Environmental Impacts of Regeneration Options for Anion Exchange Resin Remediation of PFAS Impacted Water," Water Research 207 117798, 25 pages (2021).

Carpenter et al., "Widespread Micropollutant Monitoring in the Hudson River Estuary Reveals Spatiotemporal Micropollutant Clusters and Their Sources," Environ. Sci. Technol. 52:6187-6196 (2018).

D'Agostino et al., "Certain Perfluoroalkyl and Polyfluoroalkyl Substances Associated With Aqueous Film Forming Foam Are Widespread in Canadian Surface Waters," Environ. Sci. Technol. 51:13603-13613 (2017).

Deng et al., "Removal of perfluorooctane sulfonate from wastewater by anion exchange resins: effects of resin properties and solution chemistry," Water Research 44:5188-5195 (Oct. 2010).

Deng, Liangping et al., Research on Rural Water Environment Ecological Management Model, First Edition, Yellow River Water Conservation Press, pp. 77-78, (2017). Non-English.

Deng, S., et al., "Enhanced Adsorption of Perfluorooctane Sulfonate and Perfluorooctanoate by Bamboo-derived Granular Activated Carbon," Journal of Hazardous Materials 282150-157 (2015).

Diamanti-Kandarakis et al., "Endocrine-Disrupting Chemicals: An Endocrine Society Scientific Statement," Endocr. Rev. 30:293-342 (2009).

Diedaini-Pilard and Perly, "Optimal Performances with Minimal Chemical Modification of Cyclodextrins," The 7th International Cyclodextrin Symposium Abstracts, p. 49, 1 page total (Apr. 1994).

Du et al., "Adsorption behavior and mechanism of perfluorinated compounds on various adsorbents—a review," Journal of Hazardous Materials 274:443-454 (Jun. 2014).

Fan D., et al., "Research on β-Cyclodextrin Cross-Linked Polymers Removing Chlorobenzene and Nitrobenzene in Micro-Polluted Water", Environmental Science & Technology, Dec. 15, 2010, pp. 258-260.

Folch-Cano, C. et al., "Inclusion and Functionalization of Polymers with Cyclodextrins: Current Applications and Future Prospects," Molecules 19:14066-14079 (2014).

Gallo et al., "Serum Perfluorooctanoate (PFOA) and Perfluorooctane Sulfonate (PFOS) Concentrations and Liver Function Biomarkers in a Population With Elevated PFOA Exposure," Environ. Health Perspect. 2012, 120, 655-660.

Gobindlal et al., "Solvent-Free, Ambient Temperature and Pressure Destruction of Perfluorosulfonic Acids under Mechanochemical Conditions: Degradation Intermediates and Fluorine Fate," Environ Sci Technol. 57(1):277-285. (Jan. 10, 2023). Epub Dec. 28, 2022.

Helbling, Damian, and William R. Dichtel. "Rational Design and Implementation of Novel Polymer Adsorbents for Selective Uptake of PFAS from Groundwater," 120 pages (2022).

Hishiya, T., et al., "Molecularly Imprinted Cyclodextrin Polymers as Stationary Phases of HighPerformance Liquid Chromatography," Polymer Journal 35(5):440-445 (2003).

Hu et al., "Detection of Poly- and Perfluoroalkyl Substances (PFASs) in U.S. Drinking Water Linked to Industrial Sites, Military Fire Training Areas, and Wastewater Treatment Plants," Environ. Sci. Technol. Lett. 3:344-350 (2016).

International Search Report and Written Opinion for PCT Application No. PCT/US2024/011236 dated Apr. 17, 2024, 10 pages.

International Search Report and Written Opinion for PCT Application No. PCT/US2024/048429 mailed Nov. 21, 2024, 12 pages.

(56) References Cited

OTHER PUBLICATIONS

International Search Report and Written Opinion issued by the International Searching Authority for Application No. PCT/US2020/018149, dated Apr. 20, 2020, 10 pages.
Ji et al., " Removal of GenX and Perfluorinated Alkyl Substances from Water by Amine-Functionalized Covalent Organic Frameworks," Am. Chem. Soc. 140: 12677-12681 (2018).
Kah et al., "Sequestration and potential release of PFAS from spent engineered sorbents," Sci Total Environ. 765:142770, pp. 1-10. (Apr. 15, 2021). Epub Oct. 7, 2020.
Kawano, S., et al., "Adsorption Capability of Urethane-Crosslinked Heptakis (2,6-di-O-methyl)-β-Cyclodextrin Polymers Toward Polychlorobiphenyls in Nonpolar Organic Media," Polymer Journal 47:443-448 (2015).
Kleme et al., "Phenolation of cyclodextrin polymers controls their lead and organic micropollutant adsorption," Chem. Sci. 9:8883-8889 (2018).
Klemes M, "Understanding and Designing Cyclodextrin Adsorbents for Water Purification," Diss. Northwestern University, 140 pages (2020).
Li et al., Tetrafluoroterephthalonitrile-crosslinked β-cyclodextrin polymers for efficient extraction and recovery of organic micropollutants from water, J. Chromatogr A 1541:52-56. (2018)Epub Feb. 6, 2018.
Lin, Wei., "Dynamic Modeling of the Biological Activated Carbon Bac) Process and Its Experimental Corroboration," State University of New York at Buffalo, 298 pages (1992).
Ling et al., "Benchmarking Micropollutant Removal by Activated Carbon and Porous—Cyclodextrin Polymers Under Environmentally Relevant Scenarios," Environ. Sci. Technol. 51:7590-7598 (2017).
Ling et al., "Novel Cyclodextrin Polymer Adsorbents for PFAS Removal," Forever Chemicals. CRC Press, pp. 291-313 (2021).
Mason et al., "Enhancement of CO2 Affinity in a Polymer of Intrinsic Microporosity by Amine Modification," Macromolecules 47:1021-1029 (2014).
Melzer et al., "Association Between Serum Perfluorooctanoic Acid (PFOA) and Thyroid Disease in the U.S. National Health and Nutrition Examination Survey," Environ. Health Perspect. 118:686-692 (2010).
Raoov et al., "Synthesis and Characterization of β-Cyclodextrin Functionalized Ionic Liquid Polymer as a Macroporous Material for the Removal of Phenols and As(V)," Int. J. Mol. Sci. 15(1):100-119 (2014).
Richardson et al., "Water Analysis: Emerging Contaminants and Current Issues," Anal. Chem. 90:398-428 (2018).
Sun et al., "Legacy and Emerging Perfluoroalkyl Substances Are Important Drinking Water Contaminants in the Cape Fear River Watershed of North Carolina," Environ. Sci. Technol. Lett. 3:415-419 (2016).
Tetreault et al., "Intersex and Reproductive Impairment of Wild Fish Exposed to Multiple Municipal Wastewater Discharges," Toxicol. 104:278-290 (2011).
Trang B, "Methods and Mechanisms for Per-and Polyfluoroalkyl Substance Pfas) Removal and Degradation," Diss. Northwestern University, 295 pages (2022).
Vakili, M., et al., "Regeneration of Chitosan-based Adsorbents Used in Heavy Metal Adsorption: a Review," Separation and Purification Technology 224:373-387 (2019).
Xiao et al., "Cross-linker Chemistry Determines the Uptake Potential of Perfluorinated Alkyl Substances by -Cyclodextrin Polymers," Macromolecules 52(10):3747-3752 (2019).
Xiao et al., "Cyclodextrin Polymer Network Sequesters Perfluorooctanoic Acid at Environmentally Relevant Concentrations," Am. Chem. Soc. 139:7689-7692 (2017).
Yang, S.Y., et al., "Synthesis and Characterization of Cationic and Anionic Cyclodextrin Oligomaers and Their Use in Layer-by-Layer Film Formation," Bulletin of the Korean Chemical Society 34:2016-2022 (2013).
Li, H. et al.,"Hyper-crosslinked β-cyclodextrin porous polymer: an adsorption-facilitated molecular catalyst support for transformation of water-soluble aromatic molecules," Chem. Sci. 7:905-909 (Nov. 13, 2015).
Yamasaki, H. et al., Preparation of new photo-crosslinked Beta-cyclodextrin polymer beads. Polymer Journal, Feb. 8, 2017, vol. 49, pp. 377-383.
Chularueangaksorn et al., "Regeneration and Reusability of Anion Exchange Resin Used in Perfluorooctane Sulfonate Removal by Batch Experiments", Journal of Applied Polymer Science 130(2):884-890 (Oct. 15, 2013). Epub Apr. 10, 2013.
EP Application No. 24725714.0, Extended European Search Report mailed May 13, 2026; Applicant Cyclopure, Inc.; 10 pages.

* cited by examiner

Figure 5

| Mill Time (hrs) | Destruction Efficiency (%) | | | |
|---|---|---|---|---|
| | PFOA | | PFOS | |
| | target PFAS | total PFAS | target PFAS | total PFAS |
| **4** | 96.8% | 95.9% | 77.6% | 74.7% |
| **8** | 99.6% | 98.9% | 81.6% | 80.0% |
| **12** | 99.3% | 98.6% | 88.7% | 87.4% |
| **16** | 99.8% | 99.4% | 94.1% | 93.5% |
| **20** | 99.7% | 99.4% | 96.2% | 95.9% |

Figure 7

| Sample ID | PFOS (ng) | PFHxS (ng) | PFOA (ng) | PFHxA (ng) | PFBS (ng) | Total (ng) |
|---|---|---|---|---|---|---|
| **Solid concentrate** | 360767 | 179672 | 106188 | 60157 | 47145 | **986308** |
| **Sample A** | 77345 | 32222 | 23445 | 7918 | 14360 | **236919** |
| **Sample B** | 70777 | 33822 | 16284 | 8174 | 9626 | **186767** |
| **Sample C** | 578443 | 301832 | 167745 | 99 | 89187 | **1670124** |

Figure 9

| Sample ID | PFOS | PFHxS | PFOA | PFHxA | PFBS | Total |
|---|---|---|---|---|---|---|
| **Pre-Milling PFAS (ng/g)** | 64438 | 31232 | 12740 | 7894 | 7295 | **159423** |
| **Post-Milling PFAS (ng/g)** | 21470 | 12314 | 4567 | 2741 | 2629 | **54630** |
| **Destruction (%)** | 67% | 61% | 64% | 65% | 61% | **66%** |

Figure 10

| Sample ID | PFOS | PFHxS | PFOA | PFHxA | PFBS | Total |
|---|---|---|---|---|---|---|
| **Pre-Milling PFAS (ng/g)** | 89262 | 52958 | 21036 | 15589 | 14320 | **261162** |
| **Post-Milling PFAS (ng/g)** | 15909 | 10620 | 3921 | 3388 | 2884 | **44909** |
| **Destruction (%)** | 82% | 80% | 81% | 78% | 80% | **83%** |

METHODS FOR THE DESTRUCTION OF POLYFLUORINATED ORGANIC COMPOUNDS

CROSS-REFERENCE TO RELATED APPLICATION

This application claims the benefit of priority to U.S. Provisional Application No. 63/585,442, filed on Sep. 26, 2023, which is hereby incorporated by reference in its entirety for all purposes.

BACKGROUND

The Organisation for Economic Co-Operation and Development (OECD) defines the term PFAS as "fluorinated substances that contain at least one fully fluorinated methyl or ethylene carbon atom (without any H/Cl/Br/I atom attached to it), i.e., with a few noted exceptions, any chemical with at least a perfluorinated methyl group (—$CF_3$) or a perfluorinated methylene group (—$CF_2$—) is a PFAS." PFAS are generally of synthetic origin. The U.S. Environmental Protection Agency (EPA) toxicity database includes at least 14,735 unique PFAS compounds, while PubChem (a database of molecules and their biological activities maintained by the National Center for Biotechnology Information maintained by the National Institutes of Health) lists approximately 6 million such compounds. PFAS compounds have been heavily used industrially due to their unique surfactant and water-resistance properties. However, health concerns related to their relatively high levels of bioaccumulation and potential links to hormone disruption, hypercholesterolemia, ulcerative colitis, thyroid disease, and various cancers, have led to efforts to remediate environmental PFAS contamination.

Various methods can be used for removing PFAS pollutants from the environment, for example as described by Alsbaiee et al., Nature, 2016, 529, 190; and Kah et al. Science of the Total Environment, 2021, 765, 142770. Such methods produce spent adsorbents loaded with PFAS, or upon regeneration, regenerant streams concentrated in PFAS. These concentrated mixtures of PFAS must then be further treated to destroy or reduce the amount of PFAS to safe levels before disposal. PFAS are considered hazardous at extremely low concentrations. For example, the U.S. EPA has proposed a limit of 4 ppt (ng/L) for PFOA (perfluorooctanoic acid) and PFOS (perfluorooctane sulfonic acid) in drinking water. Another example is the state of Michigan prohibits releases from wastewater treatment plants at levels above 420 ppt for PFOA and 11 ppt for PFOS. Accordingly, it is important to devise cost-effective and energy-efficient methods for degrading PFAS compounds to extremely low residual levels to meet health and environmental standards considered safe. The methods of the present disclosure provide novel, highly efficient, and cost-effective methods for degrading or decomposing PFAS in solid samples.

SUMMARY

In various embodiments, the present application discloses methods for decomposing PFAS-containing solids, comprising the steps of (a) combining a solid comprising PFAS with a co-milling agent to form a mixture of PFAS and co-milling agent, wherein the mass ratio of co-milling agent to PFAS is about 15:1 to about 1000:1 (b) milling the mixture of step (a) in a ball mill for at least about 20 hours; and wherein after said milling of step (b), the amount of PFAS remaining in the mixture is less than about 10% of the amount of PFAS in step (a). In particular embodiments, the co-milling agent is selected from the group consisting of LIOH, NaOH, and KOH. In specific embodiments, the co-milling agent is KOH. Optionally the PFAS-containing solid can comprise 50-99 wt. % of one or more inorganic salts.

The methods of the present disclosure are suitable for decomposing any PFAS or mixture of PFAS, including one or more of PFDA, PFNA, PFOS, PFOA, PFHpA, PFHpS, PFHxA, PFHxS, PFPeA, PFPeS, PFBA, PFBS, and GenX. After treatment by the method(s) of the present disclosure, the PFAS-containing solid is substantially free of PFAS.

In various embodiments of the methods of the present disclosure, the decomposing of the PFAS is carried out suing a high energy ball mill, for example a planetary ball mill. In many embodiments, the high energy ball mill is operated at about 450-600 rpm, and the direction of rotation of the ball mill is optionally changed about every 30 minutes. In embodiments where the ball mill is a high energy planetary ball mill with a sun disc to ball mill vessel rotational ratio of about 1:1.8 to about 1-2.2. In most embodiments, the milling media and the charge of PFAS-containing solid and co-milling agent occupies no more than about 35% of the empty volume of the milling vessel.

The milling vessel and milling media can be independently composed of any suitable material known in the art, including stainless steel, zirconium oxide, tungsten carbide, sintered corundum, silicon nitride, agate, polyamide/Nylon, and alumina ceramic. In particular embodiments, the milling vessel and milling media are both composed of stainless steel. In typical embodiments, the empty volume of the milling vessel (or vessels) ranges from about 100 mL to about 25 L.

BRIEF DESCRIPTION OF DRAWINGS

FIG. 5 shows total PFAS destruction efficiency (including short-chain PFAS generated during ball milling) compared to PFOA or PFOS destruction efficiency alone.

FIG. 7 shows pre- and post-milling PFAS amounts (in nanograms) for the direct milling of PFAS-containing solid residue obtained from a spent regenerant concentration.

FIG. 9 shows pre- and post-milling PFAS solid concentrations sampled from the mixture comprising sand and KOH.

FIG. 10 shows pre- and post-milling PFAS solid concentrations sampled from the mixture comprising sand and KOH.

DETAILED DESCRIPTION

Figure 1:
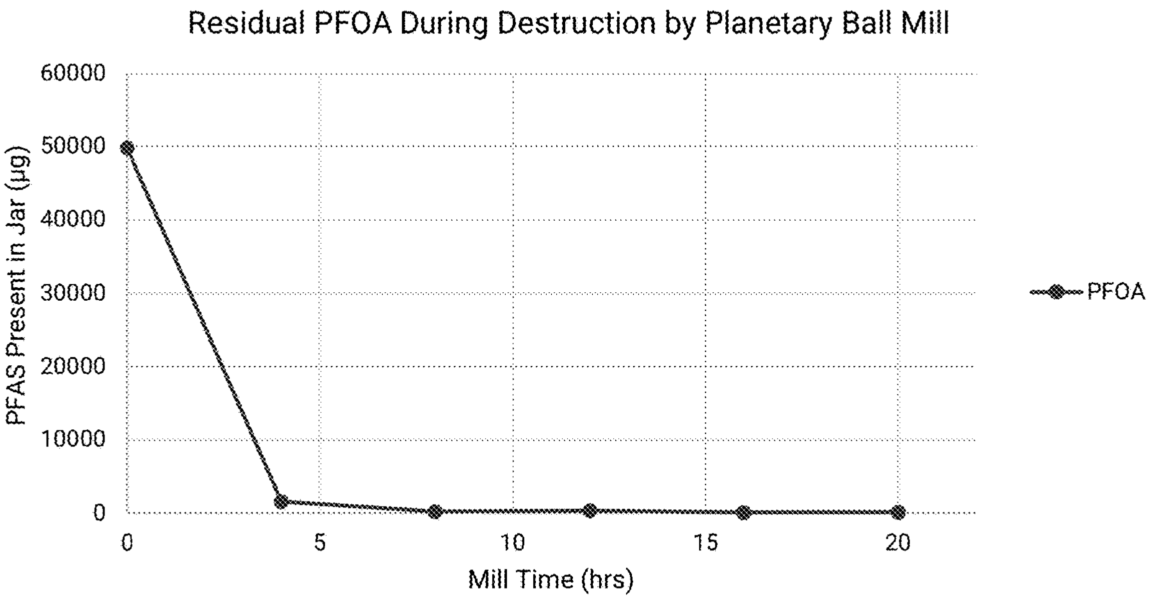
FIG. 1 shows residual levels of PFOA over 20 hours of ball milling.

PFAS, as used herein, refers to one or more per- or polyfluorinated substances, for example those described in the US EPA toxicity database. Particular examples of PFAS include, without limitation, perfluoropropionic acid (PF-PrA), perfluorobutanoic acid (PFBA), perfluoropentanoic acid (PFPeA), perfluorohexanoic acid (PFHxA), perfluoro-heptanoic acid (PFHpA), perfluorooctanoic acid (PFOA), perfluorononanoic acid (PFNA), perfluorodecanoic acid (PFDA), perfluoroundecanoic acid (PFUnA), perfluorododecanoic acid (PFDoA), perfluorotridecanoic acid (PFTrDA), perfluorotetradecanoic acid (PFTeA), perfluoro-propane sulfonic acid (PFPrS), perfluorobutane sulfonic acid (PFBS), perfluoropentane sulfonic acid (PFPeS), perfluoro-hexane sulfonic acid (PFHxS), perfluoroheptane sulfonic acid (PFHpS), perfluorooctane sulfonic acid (PFOS), per-fluorononane sulfonic acid (PFNS), perfluorodecane sulfonic acid (PFDS), perfluorododecane sulfonic acid (PFDoS), 4:2 fluorotelomer sulfonate (4:2FTS), 6:2 fluorotelomer sulfonate (6-2FTS), 8-2 fluorotelomer sulfonate (8:2FTS), 10:2 fluorotelomer sulfonate (10:2FTS), perfluorobutane sulfonamide (FBSA), N-methylperfluorobutanesulfonamide (MeFBSA), perfluorohexane sulfonamide (FHxSA), per-fluorooctane sulfonamide (PFOSA), perfluorodecane sulfonamide (FDSA), N-ethylperfluorooctane-1-sulfonamide (NEtFOSA), N-methylperfluorooctane-1-sulfonamide (NMeFOSA), perfluorooctane sulfonamido acetic acid (FOSAA), N-ethyl perfluorooctane sulfonamido acetic acid (NEtFOSAA), N-methyl perfluorooctane sulfonamido acetic acid (NMeFOSAA), N-methyl perfluorooctanesulfonamidoethanol (NMeFOSE), N-ethyl perfluorooctanesulfonamidoethanol (NEtFOSE), hexafluoropropylene oxide dimer acid (HFPO-DA, also referred to as "GenX"), 4,8-dioxa-3H-perfluorononanoate (ADONA), perfluoro-3-methoxy-propanoic acid (PFMPA), perfluoro-4-methoxybutanoic acid (PFMBA), perfluoro-3,6-dioxaheptanoic acid (NFDHA), 9-chlorohexadecafluoro-3-oxanone-1-sulfonic acid (9CI-PF3ONS), 11-chloroeicosafluoro-3-oxanonane-1-sulfonic acid (11CL-PF30UdS), perfluoro(2-ethoxyethane) sulfonic acid (PFEESA), perfluoro-4-ethylcyclohexane sulfonic acid (PFECHS), 8-chloroperfluoro-1-octanesulfonic acid (8CI-PFOS), 3-perfluoropropyl propanoic acid (3:3FTCA), 2H,2H,3H,3H-perfluorooctanoic acid (5:3FTCA), 3-perfluoroheptyl propanoic acid (7:3FTCA), 2H-perfluoro-2-dodecenoic acid (FDUEA), 2H-perfluoro-2-decenoic acid (FOUEA), bis(perfluorohexyl)phosphinic acid (6:6PFPi), (heptadecafluorooctyl)(tridecafluorohexyl) phosphinic acid (6:8PFPi), bis(perfluorooctyl)phosphinic acid (8:8PFPi), and N-(3-dimethylaminopropan-1-yl) per-fluoro-1-hexanesulfonamide (N-AP-FHxSA), and fluorinated precursors, salts, or degradation products thereof. For clarity, the term PFAS as used herein can refer to a single per- or polyfluorinated substance, or a combination of two, three, four, or more per- or polyfluorinated compounds. The term PFAS, unless otherwise indicated, refers to per- and polyfluorinated degradation products of other PFAS compounds, for example, the PFAS compounds described herein.

Various methods have been proposed for removing PFAS from contaminated environmental sources, such as the use of adsorbents including the charge-bearing cyclodextrin polymeric adsorbents as described in U.S. Pat. Nos. 11,001,645, 11,155,646, and 11,512,146, herein incorporated by reference for all purposes. Such adsorbents are efficient at removing even trace amounts of PFAS compounds from fluids (e.g., water or water extracts from solid samples). After regeneration of such adsorbents, for example as described in International Application No. PCT/US2024/011236 (herein incorporated by reference for all purposes), a relatively concentrated mixture comprising PFAS can be obtained. Ultimately, the concentrated mixture containing PFAS, or alternatively, the adsorbent loaded with PFAS must be further treated to prevent the reentry of PFAS to the environment. One approach is to simply sequester the PFAS contaminated adsorbent, or alternatively the PFAS concentrate obtained by regenerating the adsorbent in, e.g., a landfill suitable for containing hazardous waste. However, sequestration often requires special and expensive precautions to avoid releasing the isolated PFAS into the environment.

Various methods have been proposed for degrading PFAS in solid samples, including high-temperature incineration and mechanochemical degradation methods such as high-energy ball milling. High-temperature incineration requires strict process controls to ensure complete destruction of PFAS and has the added drawback of producing HF, an acidic, corrosive gas, as well as newly formed short-chain fluorinated compounds. An alternative approach is to transform PFAS into environmentally benign products, for example "mineralizing" them to fluoride salts. High-energy ball milling has been proposed by Huang et al. in U.S. Pat. No. 9,132,306 as simpler, lower cost alternative to incineration. While Huang et al. describe ball milling solid samples spiked with a single PFAS compound (i.e., PFOS, PFBS, or PFHxS) in the presence of potassium hydroxide (KOH), the processing times are relatively short (typically 4 hours, but no longer than 8 hours), and the degree of degradation is assessed by measuring residual amounts of the initial PFAS compound (e.g., PFOS) and fluoride ion ($F^-$) recovery. However, measuring the residual amounts of the initial PFAS compound in the sample does not account for the presence of environmentally significant amounts of per- and polyfluorinated degradation products which are also considered PFAS. Applicant has found that the processing times described in Huang et al. are far too short to effectively degrade the PFAS compounds in a solid sample (i.e., the initial PFAS contamination and the resulting per- and polyfluorinated degradation products). Thus, while Huang et al. describe purportedly effective degradation of PFAS after about 4 hours of processing, Applicant has found that substantially longer processing times are required to degrade the total amount of PFAS, including both the initial target PFAS and newly formed intermediary short-chain fluorinated compounds to the extremely low levels required for safe disposal.

Specifically, Applicant has found that ball milling PFAS, for example PFOA, PFOS, or mixtures of PFAS, produces shorter chain PFAS such as PFPeA, PFBA, PFHxA, and PFPrA, and that processing times of more than 8 hours are required to degrade these newly formed PFAS compounds, in addition to the initial PFAS compounds, to levels required for safe disposal. While the rate of degradation varies among individual PFAS compounds, Applicant has found that more than 8 hours of processing is necessary to provide high degrees of degradation for all PFAS compounds evaluated, including any of the PFAS compounds disclosed herein, either singly or in combination. While shorter processing times (e.g., about 4 hours) as experimentally demonstrated by Huang et al. appear effective in lowering the amount of the initial target PFAS, Huang et al. do not appear to recognize that the initial target PFAS compounds evaluated degrade to other PFAS compounds during processing, and thus Huang's conditions do not provide the high levels of total PFAS degradation (including per- and polyfluorinated degradation products) seen at longer processing times as described in this disclosure.

As discussed above, the methods of the present disclosure provide, in some embodiments, for milling a solid sample comprising PFAS in a ball mill for more than about 8 hours, for example, more than about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours, including all ranges between any of these values.

It is contemplated that the milling time may depend, in part, on the size of the ball mill apparatus, as larger ball mills operate at lower rpm, and thus impart lower levels of mechanical energy in a given time period. Larger volume ball mills will therefore require longer milling times to achieve the same level of PFAS destruction.

The processes of the present disclosure provide high levels of total PFAS destruction, for example at least about 80%, including about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 98.1%, about 98.2%, about 98.3%, about 98.4%, about 98.5%, about 98.6%, about 98.7%, about 98.8%, about 98.9%, about 99%, about 99.1%, about 99.2%, about 99.3%, about 99.4%, about 99.5%, about 99.6%, about 99.7%, about 99.8%, about 99.9%, about 99.99%, about 99.999% or 100% degradation, including any range between any of these values. It is understood that the percentage of total PFAS destruction refers to the total mass of PFAS degraded to non-PFAS compounds (e.g., inorganic fluoride, carbonate, sulfate, etc.). For example, a process of the present disclosure resulting in 98% destruction of a mixture of PFOS and PFOA would mean that only 2% by weight of any PFAS compounds (e.g., residual initial PFAS compound(s) and PFAS compounds formed during the process) remain in the sample after processing. A PFAS-containing solid treated by any of the processes of the present disclosure having a percentage of PFAS destruction after processing as described herein can be referred to as substantially free of PFAS.

In other embodiments the processes of the present disclosure produce a solid in which the concentration of total PFAS after completion of ball milling ranges from about 20% to about 1 ppm (by weight). For example, the concentration of total PFAS after completion of ball milling is no more than about 20%, about 19%, about 18%, about 17%, about 16%, about 15%, about 14%, about 13%, about 12%, about 11%, about 10%, about 9%, about 8%, about 7%, about 6%, about 5%, about 4%, about 3%, about 2%, about 1%, about 0.5%, about 0.4%, about 0.3%, about 0.2%, about 100 ppm, about 90 ppm, about 80 ppm, about 70 ppm, about 60 ppm, about 50 ppm, about 40 ppm, about 30 ppm, about 20 ppm, about 10 ppm, about 5 ppm, or about 1 ppm, or less, including any range between any of these values. A PFAS-containing solid treated by any of the processes of the present disclosure having a total PFAS concentration after processing as described herein can be referred to as substantially free of PFAS.

In most embodiments of the methods of the present disclosure, a solid comprising PFAS (e.g., solids containing ppm levels of PFAS up to higher concentrations of PFAS including pure, solid PFAS compounds) is combined with a co-milling agent. A co-milling agent is a material (e.g., a compound or mixture of compounds) which reacts with the PFAS (including degradation products of the initial PFAS compound(s)) and enhances the rate of degradation of the PFAS and/or reacts with the PFAS or fluorinated degradation products of the PFAS to form inert or environmentally more benign compounds. In most embodiments, suitable co-milling agents include inorganic hydroxides or oxides of alkali or alkaline earth metals, such as LIOH, KOH, NaOH, $Mg(OH)_2$, $Ca(OH)_2$, $Li_2O$, $Na_2O$, $K_2O$, MgO, CaO, or combinations thereof. Such co-milling agents typically react with PFAS to form inorganic fluorides (e.g., LiF, KF, NaF, $MgF_2$, and $CaF_2$, respectively), carbonates and formates (from the carbon backbone of the PFAS), and sulfates (for PFAS having sulfonate groups). In particular embodiments of the methods of the present disclosure, the co-milling agent is KOH.

In various embodiments, the co-milling agent is combined with the PFAS-containing solid to provide an effective mass ratio of co-milling agent (e.g., KOH) to PFAS of at least about 10:1 to about 1000:1, including about 10:1, about 10.5:1, about 11:1, about 11.5:1, about 12:1, about 12.5:1, about 13:1, about 13.5:1, about 14:1, about 14.5:1, about 15:1, about 15.5:1, about 16:1, about 16.5:1, about 17:1, about 17.5:1, about 18:1, about 18.5:1, about 19:1, about 19.5:1, about 20:1, about 20.5:1, about 21:1, about 21.5:1, about 22:1, about 22.5:1, about 23:1, about 23.5:1, about 24:1, about 24.5:1, about 25:1, about 25.5:1, about 26:1, about 26.5:1, about 27:1, about 27.5:1, about 28:1, about 28.5:1, about 29:1, about 29.5:1, about 30:1, about 30.5:1, about 31:1, about 31.5:1, about 32:1, about 32.5:1, about 33:1, about 33.5:1, about 34:1, about 34.5:1, about 35:1, about 35.5:1, about 36:1, about 36.5:1, about 37:1, about 37.5:1, about 38:1, about 38.5:1, about 39:1, about 39.5:1, about 40:1, about 40.5:1, about 41:1, about 41.5:1, about 42:1, about 42.5:1, about 43:1, about 43.5:1, about 44:1, about 44.5:1, about 45:1, about 45.5:1, about 46:1, about 46.5:1, about 47:1, about 47.5:1, about 48:1, about 48.5:1, about 49:1, about 49.5:1, about 50:1, about 55:1, about 60:1, about 65:1, about 70:1, about 75:1, about 80:1, about 85:1, about 90:1, about 95:1, about 100:1, about 105:1, about 110:1, about 115:1, about 120:1, about 125:1, about 130:1, about 135:1, about 140:1, about 145:1, about 150:1, about 155:1, about 160:1, about 165:1, about 170:1, about 175:1, about 180:1, about 185:1, about 190:1, about 195:1, about 200:1, about 210:1, about 220:1, about 230:1, about 240:1, about 250:1, about 260:1, about 270:1, about 280:1, about 290:1, about 300:1, about 310:1, about 320:1, about 330:1, about 340:1, about 350:1, about 360:1, about 370:1, about 380:1, about 390:1, about 400:1, about 410:1, about 420:1, about 430:1, about 440:1, about 450:1, about 460:1, about 470:1, about 480:1, about 490:1, about 500:1, about 510:1, about 520:1, about 530:1, about 540:1, about 550:1, about 560:1, about 570:1, about 580:1, about 590:1, about 600:1, about 610:1, about 620:1, about 630:1, about 640:1, about 650:1, about 660:1, about 670:1, about 680:1, about 690:1, about 700:1, about 710:1, about 720:1, about 730:1, about 740:1, about 750:1, about 760:1, about 770:1, about 780:1, about 790:1, about 800:1, about 810:1, about 820:1, about 830:1, about 840:1, about 850:1, about 860:1, about 870:1, about 880:1, about 890:1, about 900:1, about 910:1, about 920:1, about 930:1, about 940:1, about 950:1, about 960:1, about 970:1, about 980:1, about 990:1, about 1000:1, including all ranges between any of these values. When the mass ratio of co-milling agent (e.g., KOH) to PFAS is less than about 10:1, the PFAS is not completely degraded (e.g., after more than about 8 hours of ball milling), or alternatively, substantially longer ball milling times are required to improve degradation of PFAS (e.g., at least about 98% decomposition of PFAS as described herein). If the mass ratio of co-milling agent (e.g., KOH) to PFAS is greater than about 1000:1, the amount of co-milling agent (e.g., KOH)

does not further increase the rate or total amount of PFAS degradation significantly, and thus increases process cost without additional benefit, and also requires processing to neutralize the pH of the solid product, which includes excess inorganic hydroxide compound(s).

In various embodiments, the methods of the present disclosure provide for mixing one or more PFAS compounds (as described herein) with a co-milling agent (e.g., KOH) in a ball mill. Any ball mill configuration, volume, and operating parameters may be used, provided complete (e.g., about 98% or more) destruction of PFAS (including degradation products thereof) occurs after more than about 8 hours of processing. Examples of ball mill configurations include horizontal or vertical ball mills. In particular embodiments, the ball mill is a high-energy ball mill (i.e., a ball mill in which the mixture placed in the ball mill is subjected to high-energy collisions from the balls), in particular a ball mill operated in planetary fashion, with a sun disc to ball mill vessel rotational ratio in the range of about 1:1.8 to about 1:2.2 (sun disc to jar rotation ratio). In various embodiments, the rotational ratio is about 1:1.8, about 1:1.9, about 1:2, about 1:2.1, or about 1:2.2, including all ranges between any of these values.

The high-energy ball mill of the present disclosure is operated at about 50 rpm to about 900 rpm, including about 50 rpm, about 60 rpm, about 70 rpm, about 80 rpm, about 90 rpm, about 100 rpm, about 110 rpm, about 120 rpm, about 130 rpm, about 140 rpm, about 150 rpm, about 160 rpm, about 170 rpm, about 180 rpm, about 190 rpm, about 200 rpm, about 210 rpm, about 220 rpm, about 230 rpm, about 240 rpm, about 250 rpm, about 260 rpm, about 270 rpm, about 280 rpm, about 290 rpm, about 300 rpm, about 310 rpm, about 320 rpm, about 330 rpm, about 340 rpm, about 350 rpm, about 360 rpm, about 370 rpm, about 380 rpm, about 390 rpm, about 400 rpm, about 410 rpm, about 420 rpm, about 430 rpm, about 440 rpm, about 450 rpm, about 460 rpm, about 470 rpm, about 480 rpm, about 490 rpm, about 500 rpm, about 510 rpm, about 520 rpm, about 530 rpm, about 540 rpm, about 550 rpm, about 560 rpm, about 570 rpm, about 580 rpm, about 590 rpm, about 600 rpm, about 610 rpm, about 620 rpm, about 630 rpm, about 640 rpm, about 650 rpm, about 660 rpm, about 670 rpm, about 680 rpm, about 690 rpm, about 700 rpm, about 710 rpm, about 720 rpm, about 730 rpm, about 740 rpm, about 750 rpm, about 760 rpm, about 770 rpm, about 780 rpm, about 790 rpm, about 800 rpm, about 810 rpm, about 820 rpm, about 830 rpm, about 840 rpm, about 850 rpm, about 860 rpm, about 870 rpm, about 880 rpm, about 890 rpm, or about 900 rpm, including any ranges between any of these values. In particular embodiments, the high-energy ball mill is operated at about 500 rpm. The high-energy ball mill can be operated such that the direction of rotation is unchanged during the process, or such that the direction of rotation is reversed periodically during operation. In particular embodiments, the direction of rotation is reversed (changed) about every 15-45 minutes, including reversing the direction of rotation about every 15 minutes, about every 20 minutes, about every 25 minutes, about every 30 minutes, about every 35 minutes, about every 40 minutes, or about every 45 minutes, including any range between any of these values. In particular embodiments, the direction of rotation of the high-energy ball mill is reversed about every 30 minutes during operation.

The mill jar of the ball mill of the present disclosure contains milling media, typically in the form of balls, for milling the PFAS-containing solid with the co-milling agent. The balls can all be of approximately the same diameter or can contain balls of varying diameter. Suitable diameters for the balls of the disclosed methods range from about 1 mm to about 25 mm, including about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, or about 25 mm, including all ranges between any of these values. In particular embodiments, at least some of the balls can have a diameter of about 6 mm. In other embodiments, at least some of the balls can have a diameter of about 10 mm. In still other embodiments, the balls can be a mixture of 6 mm diameter and 10 mm diameter.

The number of balls placed in the mill jar should be selected such that the total volume of the balls and the PFAS-containing solid and co-milling agent does not exceed about 35% of the empty jar volume. In various embodiments, the total volume of the balls and PFAS-containing solid ranges from about 15% to about 35%, including about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, or about 35%, including any ranges between any of these values. In particular embodiments, the empty volume of the mill jar can range from about 100 mL up to about 25 L, including about 100 mL, about 200 mL, about 250 mL, about 300 mL, about 400 mL, about 500 mL, about 600 mL, about 700 mL, about 750 mL, about 800 mL, about 900 mL, about 1000 mL, about 2 L, about 3 L, about 4 L, about 5 L, about 6 L, about 7 L, about 8 L, about 9 L, about 10 L, about 11 L, about 12 L, about 13 L, about 14 L, about 15 L, about 16 L, about 17 L, about 18 L, about 19 L, about 20 L, about 21 L, about 22 L, about 23 L, about 24 L, or about 25 L, including any ranges between any of these values. In particular embodiments, the empty volume of the mill jar is about 100 mL.

In various embodiments the total volume of the balls added to the mill jar is about 15-35% of the empty volume of the mill jar (e.g., about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, or about 35%, including any ranges between any of these values). In particular embodiments, the total volume of the balls is about 20% of the empty volume of the mill jar. In a particular embodiment, the empty volume of the mill jar is about 100 mL, and about 100 6-mm diameter and 16 10-mm diameter balls are used.

The mill jars and balls can independently comprise any suitable material, including for example, stainless steel, zirconium oxide, tungsten carbide, sintered corundum, silicon nitride, agate, polyamide/Nylon, or alumina ceramic. The mill jar and balls can be the same or different material, but in particular embodiments, the mill jar and balls comprise the same material. In specific embodiments, the mill jar and balls are stainless steel.

The solid PFAS-containing compositions processed using the methods of the present disclosure can, in some embodiments, include inorganic salts, such as alkali (e.g., $Li^+$, $Na^+$, $K^+$, or $Cs^+$) or alkaline earth metal chlorides, nitrates, sulfates, phosphates, hydroxides, or combinations thereof. In particular embodiments, the salt comprises lithium sulfate ($Li_2SO_4$), sodium sulfate ($Na_2SO_4$), potassium sulfate ($K_2SO_4$), cesium sulfate ($Cs_2SO_4$), lithium chloride (LiCl), sodium chloride (NaCl), potassium chloride (KCl), ammonium chloride ($NH_4Cl$), lithium hydroxide (LiOH), sodium hydroxide (NaOH), potassium hydroxide (KOH), ammonium hydroxide ($NH_4OH$), or ammonium acetate ($NH_4OAc$), or combinations thereof.

The solid PFAS-containing compositions can, in some embodiments, be produced by concentrating spent regenerants used in regenerating PFAS-laden spent adsorbents. These concentrated spent regenerants are sometimes referred to as still bottoms. The concentration PFAS-containing spent regenerants can be achieved by methods such as, but not limited to distillation or evaporation, concentration via membranes, reverse osmosis, etc. In cases where the adsorbents were used to treat PFAS-contaminated water, the water source originally treated by adsorbents may produce concentrates that can be sticky or difficult to recover from the concentration apparatus, so that the PFAS concentrate can be loaded into a ball mill for subsequent processing as described herein.

Various solid additives can be used to immobilize or adsorb PFAS to facilitate the recovery of PFAS from regenerant concentrates for the ball milling process. In various embodiments, such solid additives can be added to partially concentrated spent regenerant followed by additional evaporation or drying steps to further concentrate the PFAS in the presence of the solid additive. The resulting solid mixture is ideally a free-flowing, PFAS-laden solid, having the form of a powder or granular composition which can be easily transferred to milling jars. In some embodiments, these solid additives comprise, without limitation, ceramics, polymers, oxides, composites, minerals, chemicals, and biomaterials. In particular embodiments, the examples of solid additives comprise alumina, zirconia, silica, silicon carbide, boron nitride, titanium dioxide, quartz, kaolin, nylon, polyethylene, polystyrene, polypropylene, polyvinyl chloride, polycarbonate, polyethylene terephthalate, porous cyclodextrin polymers as described in U.S. Pat. Nos. 9,624,314 and 11,001,645, ion-exchange resins, etc., magnesium oxide, zinc oxide, calcium oxide, iron oxides, limestone, calcite, dolomite, bauxite, graphite, talc, mica, gypsum, barite, graphene, carbon black, charcoal, chitin, lignin, cellulose or cellulosic materials, salts (chlorides, phosphates, carbonates, sulfates, nitrates), or combinations thereof. The solid additives can be porous or non-porous. Such solid additives can have particle sizes in the range of about 1 μm up to about 3000 μm, including about 1 μm, about 2 μm, about 3 μm, about 4 μm, about 5 μm, about 6 μm, about 7 μm, about 8 μm, about 9 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, about 1000 μm, about 1100 μm, about 1200 μm, about 1300 μm, about 1400 μm, about 1500 μm, about 1600 μm, about 1700 μm, about 1800 μm, about 1900 μm, about 2000 μm, about 2100 μm, about 2200 μm, about 2300 μm, about 2400 μm, about 2500 μm, about 2600 μm, about 2700 μm, about 2800 μm, about 2900 μm, about 3000 μm, including any ranges between any of these values.

Alternatively, PFAS-containing concentrates of spent regenerant can be passed through a column packed with an adsorbent capable of removing PFAS from the said concentrate, resulting in the concentration of PFAS in a relatively smaller solid mass. Subsequently, the PFAS-laden adsorbent can be dried and easily transferred to milling jars to start the ball milling process. The concentrate can be obtained from partial or full evaporation or distillation of the original spent PFAS-containing regenerant. In particular embodiments, the concentrate is an aqueous solution (in the case of partial evaporation/distillation of the spent regenerant) or reconstituted in water (in the case of full evaporation/distillation of the spent regenerant into a PFAS-containing solid). The adsorbent can comprise, without limitation, activated carbon, ion exchange resins, cyclodextrin-based polymer adsorbents (e.g., the adsorbents described in U.S. Pat. No. 11,001,645, incorporated herein by reference for all purposes), clay-based adsorbents, or other polymeric resins capable of adsorbing PFAS. In various embodiments, these adsorbents may be granular materials with a particle size range of about 150 μm up to about 3000 μm, including about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, about 1000 μm, about 1100 μm, about 1200 μm, about 1300 μm, about 1400 μm, about 1500 μm, about 1600 μm, about 1700 μm, about 1800 μm, about 1900 μm, about 2000 μm, about 2100 μm, about 2200 μm, about 2300 μm, about 2400 μm, about 2500 μm, about 2600 μm, about 2700 μm, about 2800 μm, about 2900 μm, about 3000 μm, including any ranges between any of these values.

EXAMPLES

Materials

Methanol—Fisher Chemical, HPLC grade; Ethanol—Spectrum, 190 proof, Reagent grade; Nanopure water—obtained from Milli-Q system; Acetic acid—Fisher Chemical, glacial HPLC grade; Potassium hydroxide (KOH)—Fisher Chemical, flakes, technical grade; Potassium sulfate ($K_2SO_4$)—Sigma Aldrich, BioUltra grade; Sand ($SiO_2$)—Sigma Aldrich, 50-70 mesh particle size.

Example 1: Ball Milling PFOA Only or PFOS Only with KOH for 8 Hours

To prepare the reaction, two clean 100 mL stainless steel vacuum seal mill jars are each loaded with 100 small stainless steel milling balls (6 mm in diameter, average weight of 0.89 g) and 16 large stainless steel milling balls (10 mm in diameter, average weight of 4.13 g). The vacuum sealed ball mill jars all have an inner diameter of 53 mm and an inner height of 55 mm with a wide (88 mm) outer lip to bolt on the lid with 6 hex screws. The atmosphere of the mill jar is modified ambient air. The PFAS added to the mill jar is either PFOA or PFOS in its potassium salt form, at a weight of 50 mg±2.5 mg. The PFAS is loaded in a mill jar atop the small and large balls. The co-milling agent (KOH) is added next, at a weight of 0.75 g±0.04 g. After firmly attaching and checking the seal of the lids, the jars are weighed to ensure that each is within 3 wt. % of the other for proper counterbalance of the ball mill, before loading and locking them into opposite grinding slots on the mill's sun wheel. The ball mill is then set to run at a revolution rate of 500 rpm, changing direction every 30 minutes with no additional pause between direction intervals. The reaction is started and allowed to progress for 8 hours (16 rotation intervals).

After milling for 8 hours, the jar lids are unscrewed and 75 mL of a 1:1 (v/v) solution of nanopure water and methanol are added to the chamber. The lids are then reattached, and the jars are sonicated for 30 minutes to fully suspend the solids within the mixture. An aliquot for analysis is then immediately collected. After several stepwise dilutions, the remaining concentration of the initial PFAS is measured with mass spectroscopy (LC-MS) and the completeness of destruction is calculated.

LC-MS results from the milling of PFOA and PFOS according to the above procedures yielded unexpected destruction results in comparison to previously reported results provided by Huang et al. The direct measurements of PFOA and PFOS demonstrated 99.6% and 81.6% destruction, respectively, corresponding to about 0.2 mg of PFOA and 10.2 mg of PFOS. However, an extended LC-MS scan of over 80 other common PFAS revealed that several PFAS of chain lengths below 8 carbons that were not in the original PFAS sample were present in nontrivial amounts after 8 hours of milling. After 8 hours of milling 50 mg PFOA, 0.22 mg of PFOA and 0.32 mg of total other shorter-chain PFAS remained in the solid products. The majority of the 0.32 mg consisted of short chain PFAS that were not present in the original PFOA sample—namely, PFPeA, PFBA, and PFPrA. After 8 hours of milling 50 mg of PFOS, 9.91 mg of PFOS and 0.85 mg of total other shorter-chain PFAS remained in the solid products. A significant portion of the 0.85 mg consisted of short chain (≤6 carbons) perfluorocarboxylic acids, including PFHxA, PFPeA, PFBA, and PFPrA; the rest were impurities from the original PFOA manufacturing process. These findings indicate that the mechanochemical destruction process outlined by Huang et al. are not suitable for the transformation of hazardous solid PFAS to more manageable waste, as the amounts of residual starting PFAS and newly generated PFAS could potentially be high enough to pose a challenge to proper disposal depending on the scale of ball milling.

Example 2: Ball Milling Kinetics of PFOA Destruction

Figure 2:
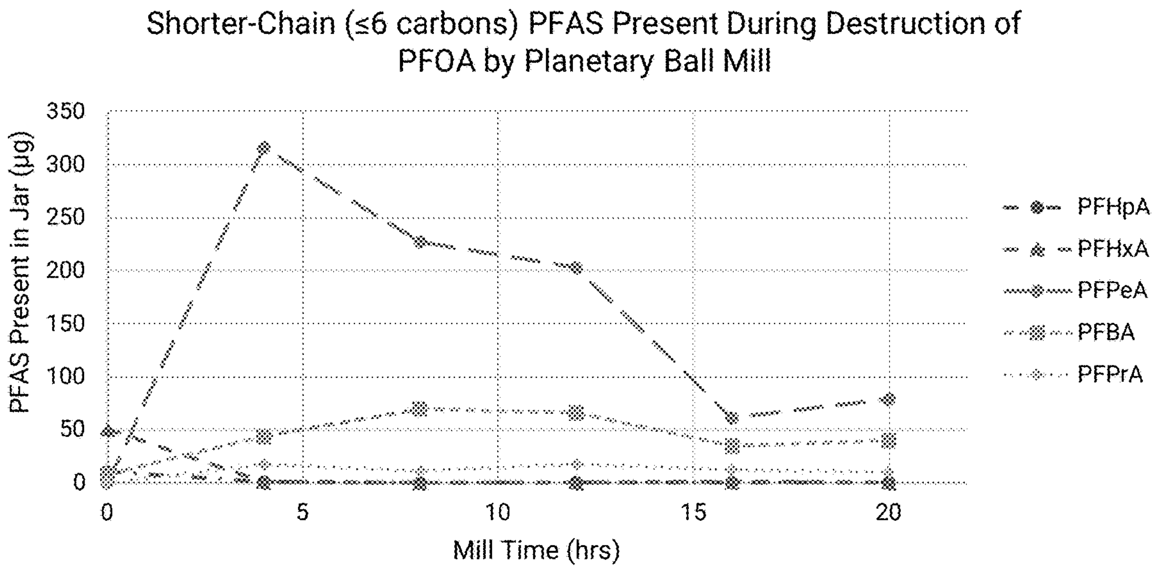
FIG. 2 shows levels of various short-chain PFAS generated during degradation of PFOA during ball milling.

To understand how the initial PFAS are degraded into shorter-chain PFAS, further experiments were undertaken to measure the amounts of various PFAS products present in the mill jar after the ball milling of PFOA at various treatment times. Each trial followed the procedures outlined in Example 1 with PFOA only or PFOS only, but the total milling time was carried out in increments of from 4 to 20 hours. As is shown in FIG. 1, the initial PFOA concentration decreased significantly after 4 hours of milling. However, as shown in FIG. 2, significant amounts (>0.3 mg) of PFPeA were formed from PFOA after 4 hours of milling, that then gradually decreased to around 0.07 mg after 20 hours of milling. This 75% decrease demonstrates how extended treatment times are necessary to effectively degrade not only PFOA, the initial target PFAS, but also the shorter-chain PFAS like PFPeA that are generated as intermediates of degradation process. Similar increases in other PFAS such as PFBA and PFPrA were also observed during the first 8-12 hours of milling, reinforcing the importance of extended treatment time to further degrade these short-chain products.

Example 3: Ball Milling Kinetics of PFOS Destruction

The experiments in this example confirm that shorter-chain PFAS generation occurs during the destruction of PFOS as was observed with the destruction of PFOA at shorter milling times. Each trial follows the same experimental procedure as Example 2.

Figure 3:
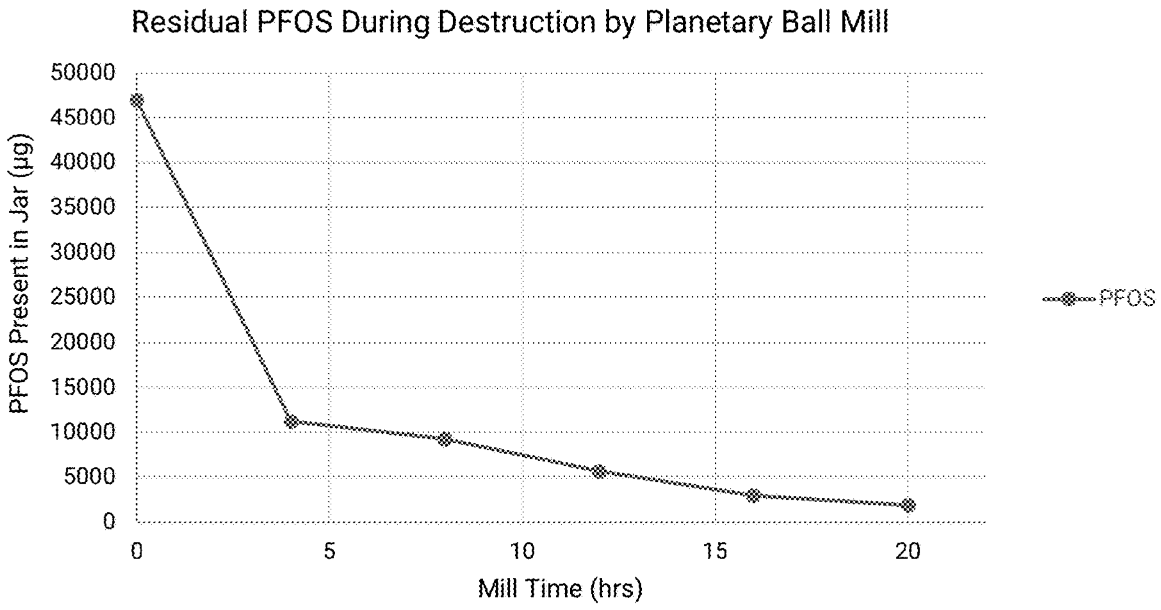
FIG. 3 shows residual levels of PFOS over 20 hours of ball milling.
Figure 4:
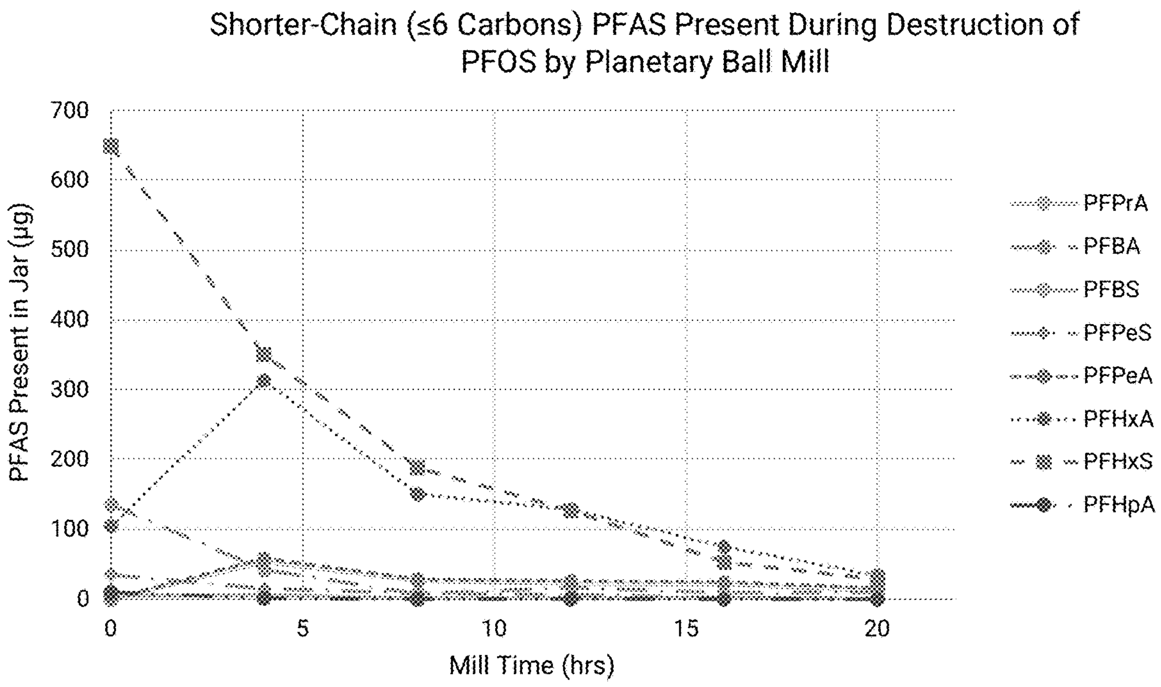
FIG. 4 shows levels of various short-chain PFAS generated during degradation of PFOS during ball milling.

FIGS. 3 and 4 illustrate that as PFOS is destroyed, similar levels of short-chain PFAS were seen to form in the first 4 hours of milling (>0.3 mg) as with the destruction of PFOA, with some interesting differences. PFOS consistently degraded into short-chain perfluoro carboxylic acids (PFCA), not sulfonic acids. It should be noted that PFHxS, PFPeS, and PFBS were present at t=0, meaning that they were impurities in the original PFOS rather than being degradation products. The most significant PFCA generated was PFHxA; ball milling PFOS yielded>0.3 mg of PFHxA after 4 hours of milling, then degraded to around 0.03 mg after 20 hours of milling (>80% degradation). Similar increases in PFPeA and PFPrA were seen during the first 4 hours of milling before being gradually degraded by over 80% after a total of 20 hours of milling. Thus, to evaluate the complete destruction efficiency of this planetary ball milling technique as a realistic PFAS destruction method, calculations of the destruction efficiency must account for all shorter-chain PFAS present in the final product, not only the amount of the original target PFAS remaining. FIG. 5 illustrates the importance of this margin by comparing destruction efficiencies of PFOA only and PFOS only samples at various milling times calculated by only measuring the mass of the original target PFAS that remains in the mill jar versus the efficiencies calculated from the total mass of all measured PFAS remaining in the jar, including both residual target PFAS and all short-chain products. This approach is especially critical with PFOS, which degrades more slowly than PFOA.

Example 4: Ball Milling a PFAS Mixture

After identifying the importance of extended mill time on total PFAS destruction, the experiment described here shows the efficacy of this method on the simultaneous destruction of four commonly targeted PFAS in combination. The four PFAS evaluated here are PFOA, PFOS, PFBS, and GenX (HFPO-DA), henceforth referred to as "4 PFAS mix." This experiment was designed to evaluate the completeness of individual and total PFAS destruction of the 4 PFAS mix after an extended milling time and to evaluate the amount of fluorine recovered as fluoride ion from a 24-hour destruction process.

This experiment followed the procedure outlined in Example 1 with two adjustments: (1) the total PFAS mass was about 100 mg with equal proportions of each PFAS (25 mg each), adjusting the mass of KOH (1.50 g±0.04 g) proportionately to keep the KOH:PFAS mass ratio consistent, and (2) extending the milling time to 24 hours to ensure the thorough degradation of the shorter-chain PFAS formed during the early stages of milling.

Figure 6:
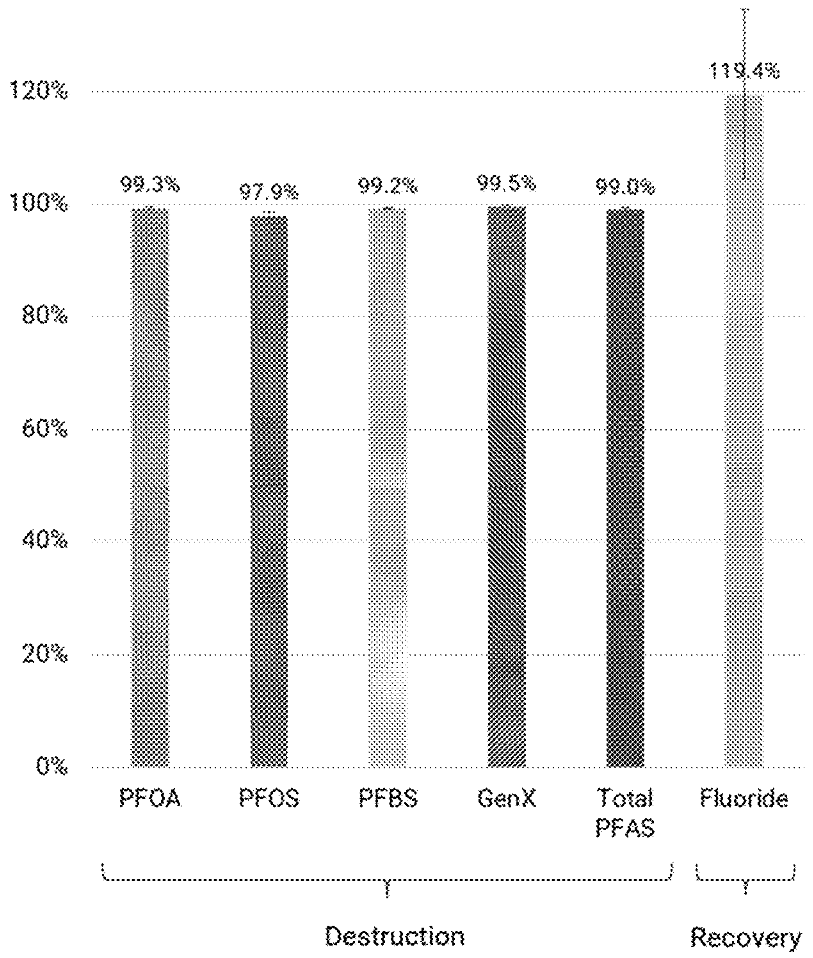
FIG. 6 shows total PFAS destruction efficiency and inorganic fluoride recovery after 24-hour ball milling a mixture of PFOA, PFOS, PFBS, and GenX.

FIG. 6 shows that 24 hours of milling under the conditions outlined in Example 1 with a 15:1 mass ratio of KOH:PFAS yields excellent destruction of each individual species in the 4 PFAS mix with ≥97.9% efficiency. Additionally, <0.20 mg of PFPeA, PFBA, and PFPrA were found to remain in the jar after 24 hours of milling, indicating that this treatment time was similarly effective in destroying these newly formed shorter-chain PFAS. The fluoride ion generated by the 24-hour destruction of the 4 PFAS Mix, as measured by an ion selective electrode probe after dilution with a pH-neutralizing buffer, demonstrated that >100% of original organic fluorine was converted into fluoride ion.

Ball Milling a PFAS Mixture Recovered from a Spent Adsorbent Regeneration Process The ball milling of a solid PFAS mixture extracted through the regeneration of a spent adsorbent was tested using a cyclodextrin-based polymer adsorbent (DEXSORB® from Cyclopure). 8 kg of DEXSORB® granules were deployed to treat reverse osmosis (RO) concentrate generated from the filtration of PFAS-contaminated surface water. Over 274 days of operation, the DEXSORB® column treated>200,000 gallons of RO concentrate having >350 ng/L total PFAS concentration.

Column regeneration experiments were performed using a liquid chromatography column consisting of a borosilicate glass barrel and PEEK endpieces. Each column was prepared by capping and sealing the column bottom, then filling the column with loosely packed glass wool, and finally adding spent DEXSORB® granules as described in the previous paragraph up to a height of 30 cm, corresponding to roughly 70 g of wet adsorbent. After allowing the column to settle and topping it off with water, the final height of the packed adsorbent was recorded. A felt filter was placed near the top of the column to prevent particle loss during backwash. Finally, the column was capped, and outlet nozzles were attached. 300 mL of the regenerant (or regeneration solution) was poured into a 500 mL HDPE bottle. The bottle lid was outfitted with two drilled holes to hold tubing, and both the inlet and outlet tubing (Masterflex US High-Performance Precision Tubing, L15) were inserted through the lid and attached to the inlet and outlet of the column. The inlet tubing was then locked in place in the head of a Masterflex US Standard Digital Drive Pump. The drive was set to upflow mode, and the pump line was primed until the regenerant reached near the column, with the flow rate set to 20 mL/min. Circulation was halted after two hours of backwash. The outlet tubing from the top of the column was slightly raised in the HDPE bottle until it was no longer submerged, and the drive was set to downflow mode. Downflow circulation was initiated at the same flow rate (20 mL/min) to purge the regenerant off the column. Upon completion, the pump was stopped, and the 500 mL HDPE bottle was exchanged with a new one containing 300 mL of fresh regenerant. Backwashing of the adsorbent in the same column was repeated until five regeneration cycles had been completed for a total regenerant volume of 1500 mL.

The recovery of PFAS-containing solid was achieved through the evaporation of solvents from the regenerant, leaving a solid residue on which ball milling could be performed. Various evaporation techniques were tested to afford the most suitable solid residue:

Distillation: A simple distillation setup consisting of a hot plate and crucible, 1 L round-bottom boiling flask, a distillation head coupled with a condensation column, and 500 mL round-bottom collection flask. The distillation was performed under slight vacuum. One 300 mL cycle of spent regenerant from a column experiment was placed in the boiling flask with a stir bar and underwent distillation until a solid mixture containing PFAS was obtained in the boiling flask. This process was repeated for the remaining four treatment cycles (4×300 mL) until complete distillation was achieved and only solids remained in the boiling flask.

Rotary Evaporation: A rotary evaporator was used as an alternative way to concentrate the spent regenerant and isolate the PFAS reclaimed from the spent DEXSORB® granules. One 300 mL cycle of spent regenerant was added to a pear-shaped rotating flask of the rotary evaporator. A heating bath of tap water was set to 65° C. and the condensation column was set to 18° C. The pear-shaped flask was then lowered into the heating bath, set to rotate at 100 rpm, and placed under ~370 mbar of vacuum. On average, the volume of spent regenerant reduced to <15 mL in 1 hour, resulting in about 20× concentration factor. The concentrate was then collected in a centrifuge tube. The residue in the rotating flask was rinsed with a few milliliters of methanol amended with <0.02 g/L KOH to remove residual PFAS from the glass, and the rinsate was added to the concentrate in the centrifuge tube. The next cycle of spent regenerant was added to the rotating flask without further cleaning of the flask and all concentrates were collected.

Nitrogen Evaporation: Further concentration of rotary evaporated samples was achieved using a nitrogen evaporator. The concentrates were transferred to 15 mL centrifuge tubes and placed in a heated crucible. The crucible was attached to a gas manifold connected to a nitrogen cylinder tank. Needles were attached to the Luer fittings on the manifold above each centrifuge tube, and the manifold top was lowered such that the needle tips were no closer than two inches from the meniscus of the samples. The manifold was then set to 65° C. such that the internal solution temperature of the solutions reached 55° C. The nitrogen flow was turned on at a pressure of 10-15 psi. The sample volumes were monitored so as to not drop below 2 mL of solution. As the samples became increasingly concentrated, they were transferred into a single tube until the final combined concentrate was below 5 mL in one 15 mL centrifuge tube.

The ball milling of solid PFAS residues recovered from the abovementioned spent regenerants followed a similar setup as described in Example 1. The total milling time was 24 hours.

Two different post-milling analytic sample preparation protocols were followed. In Example 5, the jar lids were left to settle for 30 minutes after milling was complete. Then the lids were unscrewed and 75 mL of a 1:1 (v/v) solution of nanopure water and methanol were added to the chamber. The lids were then reattached, and the jars were sonicated for 30 minutes to fully suspend the solids within the mixture. An aliquot for analysis was then immediately collected. After several stepwise dilutions, the remaining concentration of the PFAS was measured via LC-MS and the completeness of destruction was calculated relative to the initial PFAS amount.

In Example 6 and Example 7, the method for eluting PFAS from post-milled solids was adapted from Gobindlal et al. (Environ. Sci. Technol., 2023, 57, 277). The jars were left in the mill for at least 30 minutes to allow any particles to settle. The jars were then opened, and three different 0.1 g aliquots of the milled solid sample were weighed into 15 mL centrifuge tubes. 10 mL of 1% ammonia in methanol were then added to each tube. The mixtures were vortexed and sonicated for 60 minutes. Next, 0.6 mL of 50% acetic acid in water was added to each tube to neutralize the solution, and the tubes were sonicated for a further 30 minutes. Finally, the tubes were centrifuged at 4800 rpm for 10 minutes. The remaining concentration of the PFAS was measured via LC-MS and the completeness of destruction was calculated relative to the initial PFAS amount.

Example 5: Ball Milling of a Solid PFAS Residue as Reclaimed from a Regenerant The regenerant was 2:1 (v/v) ethanol-water mixture amended with 0.5 g/L of $K_2SO_4$. The sticky residue on the walls of round-bottom flask after completion of distillation of the PFAS-containing regenerant was collected by rinsing the flask with a minimal amount of methanol. This methanol solution was then transferred into an empty 100 mL vacuum mill jar. The jar was then covered with a Kimwipe (laboratory tissue), and the methanol was allowed to completely evaporate in a fume hood over several days before subjecting the PFAS-containing solid to ball milling for 24 hours.

After milling, the dried solids were still visibly adhered to the walls and floor of the jar despite the sustained impacts of 24 hours of rotation. Three separate rounds of solvent addition and sonication were required before notable amounts of visible matter were observed to be dislodged from the walls of the ball mill. These three separate elutions were labeled Sample A, B, and C, and each was diluted and analyzed via LC-MS separately (FIG. 7). The concentrations of the highest five PFAS species across all three elution samples show that while the first sonication round suggests that a significant proportion of PFAS were destroyed during ball milling, the high quantities of PFAS present in the last elution show that "hot spots" of relatively large amounts of PFAS persisted in the dried coating formed upon the initial methanol transfer of spent regenerant, hindering the accessibility of PFAS for the high-energy collisions required for degradation. This example of ball milling reclaimed solids from a concentrated regenerant suggested that the PFAS-containing solids should ideally be in the form of a free-flowing solid that can be loaded on top of the mill balls, rather than adhered to the jar wall.

Figure 8A:
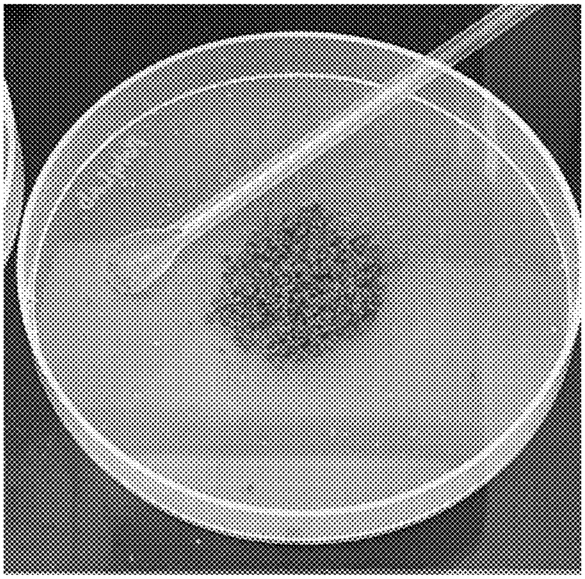
FIG. 8A shows 4 g of sand loaded with spent regenerant concentrate dried in a polypropylene Petri dish.
Figure 8B:
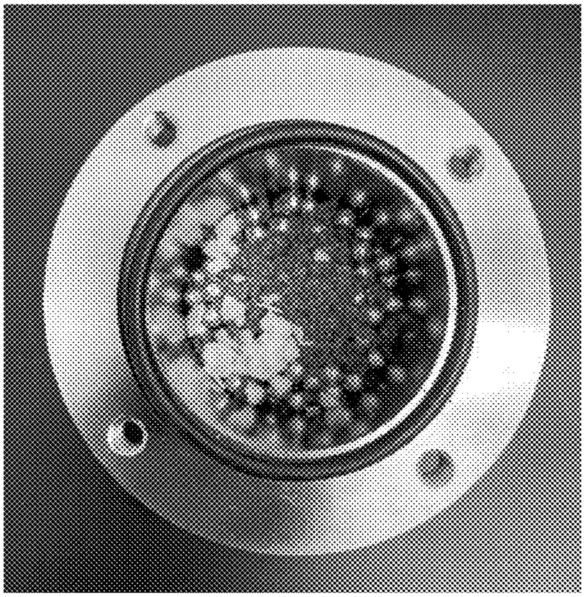
FIG. 8B shows 4 g of sand loaded with spent regenerant concentrate loaded into a stainless-steel mill jar together with KOH flakes.

Example 6: Ball Milling of a Solid PFAS Residue Reclaimed from a Regenerant as a Free-Flowing Solid The regenerant used in this experiment was ethanol amended with 0.76 g/L of KOH as ethanol can be more readily removed by distillation or evaporation steps prior to ball milling. The spent regenerant was initially concentrated using a rotary evaporator, followed by further evaporation of the regenerant solvent under a nitrogen gas stream. After nitrogen concentration, the total 3.5 mL of reclaimed PFAS solution was pipetted atop 4 g of sand ($SiO_2$) in a polypropylene Petri dish. All of the solution appeared to be readily adsorbed by $SiO_2$. The mixture was then allowed to air dry in a fume hood over several days. The final product was dark tan in color and displayed some cohesion, but still separated easily and appeared dry (FIG. 8A). The PFAS-laden sand was then added atop stainless-steel mill balls in a 100 mL vacuum jar alongside 1 g of KOH flakes (FIG. 8B), corresponding to a $SiO_2$:KOH mass ratio of 4:1.

The mixture was then milled for 24 hours according to the standard protocol, except the direction of rotation was changed every 15 minutes as opposed to every 30 minutes. After milling, the jars were vented through the top nozzles on the lid, releasing an audible burst of gas. Samples of milled solids for LC-MS analysis were prepared in triplicate as described earlier. The analytical results showed an overall PFAS destruction efficiency of 66% (FIG. 9) when PFAS-containing solid reclaimed from a spent regenerant was immobilized onto sand, providing the PFAS in a free-flowing solid form factor more suitable for destruction by ball milling.

Example 7: Ball Milling of a Solid PFAS Residue Reclaimed from a Regenerant, in the Form of a Free-Flowing Solid at a Higher Charge Ratio The procedures developed in Example 6 were followed in this example. In this experiment, the amount of $SiO_2$ used to adsorb the PFAS concentrate was decreased to minimize the abrasive degradation of the mill jar, decrease the $SiO_2$:KOH mass ratio, and increase the mass ratio of mill balls to reagents, also known as the charge ratio. After nitrogen concentration using the methodology described above, the reclaimed PFAS solution was added to 2 g of $SiO_2$ in a polypropylene Petri dish, then more $SiO_2$ was added in increments of 0.25 g until all the concentrate solution was visually observed to be adsorbed onto the sand. The final amount of $SiO_2$ used was 3 g. The mixture was then left in a fume hood to air dry for several days.

The PFAS-laden sand was then added atop stainless-steel mill balls in a 100 mL vacuum jar together with 1 g of KOH flakes, and the mixture was milled for 24 hours under the same conditions in Example 6. After milling, the jars were vented through the top nozzles on the lid, releasing the same audible burst of gas described above. The residual PFAS from the milled solid was eluted as described in Example 6. The analysis of the post-milled solid provided an improved overall PFAS destruction efficiency of 83% (FIG. 10).

Example 8: Destruction of a PFAS-Laden Adsorbent

A spent regenerant containing PFAS is initially concentrated using a distillation or evaporation apparatus. The concentrate is an aqueous solution or PFAS-containing solid or concentrate reconstituted with water to create an aqueous solution. The aqueous concentrate is then passed through a column packed with PFAS adsorbents in granular form (activated carbon, ion exchange resin, or cyclodextrin-based polymer adsorbent). Once the PFAS from the aqueous PFAS solution is adsorbed onto the media in the column, the effluent is considered PFAS-free and is discharged safely. After passing the entire concentrate through the column, the PFAS-laden granular adsorbent is recovered and allowed to dry over several days under ambient conditions or at elevated temperatures. The dried granular adsorbent is then added atop stainless-steel mill balls in a milling jar alongside KOH flakes at a KOH:PFAS mass ratio of at least 15:1.

The resulting PFAS-containing solid mixture is then milled for 24 hours according to the protocol described in Example 7. After milling, the jars are vented through the top nozzles on the lid. Samples of milled solids for LC-MS analysis are prepared in triplicate as described earlier. Analysis of the milled samples provides a PFAS destruction efficiency of 50% or higher.

The invention claimed is:

1. A method for decomposing PFAS in a solid, comprising the following steps:
   (a) combining a solid comprising PFAS with a co-milling agent to form a mixture of PFAS and co-milling agent, wherein the mass ratio of co-milling agent to PFAS is about 15:1 to about 1000:1; and
   (b) milling the mixture of step (a) in a ball mill for at least about 20 hours; wherein after said milling of step (b), the amount of PFAS remaining in the mixture is less than about 10% of the amount of PFAS in step (a).

2. The method of claim 1, wherein the co-milling agent is selected from the group consisting of LiOH, NaOH, and KOH.

3. The method of claim 2, wherein the co-milling agent is KOH.

4. The method of claim 1, wherein the solid comprising PFAS of step (a) further comprises about 50-99 wt. % of one or more inorganic salts.

5. The method of claim 1, wherein the PFAS comprises one or more of PFDA, PFNA, PFOS, PFOA, PFHpA, PFHpS, PFHxA, PFHxS, PFPeA, PFPeS, PFBA, PFBS, and GenX.

6. The method of claim 1, wherein after said milling of step (b), the mixture is substantially free of PFPeA, PFBA, and PFPrA.

7. The method of claim 1, wherein said milling of step (b) is with a high energy ball mill operated at about 450-600 rpm.

8. The method of claim 1, wherein the direction of rotation of the ball mill is changed about every 15-45 minutes.

9. The method of claim 1, wherein the milling of step (b) is with a high energy ball mill operated at about 500 rpm, and the direction of rotation of the ball mill is changed about every 30 minutes.

10. The method of claim 1, wherein the ball mill is a high energy planetary ball mill with a sun disc to ball mill vessel rotational ratio of about 1:1.8 to about 1:2.2.

11. The method of claim 1, wherein the ball mill comprises a milling vessel in which the mixture of step (a) and milling media are disposed, whereby the mixture is milled in step (b), and the total volume of milling media and the mixture of step (a) in the ball mill is no more than about 35% of the empty milling vessel volume.

12. The method of claim 11, wherein the milling vessel volume ranges from about 100 mL to about 25 L.

13. The method of claim 11, wherein the milling vessel and milling media are independently made of a material selected from the group consisting of stainless steel, zirconium oxide, tungsten carbide, sintered corundum, silicon nitride, agate, polyamide/Nylon, and alumina ceramic.

14. The method of claim 13, wherein the milling vessel and milling media are made of stainless steel.

15. The method of claim 11, wherein the volume of the empty milling vessel is about 100 mL.

16. The method of claim 15, wherein the milling media comprises 100 6-mm diameter balls and 16 10-mm diameter balls.

17. The method of claim 1, wherein the solid comprising PFAS comprises a solid selected from the group consisting of a ceramic, polymer, oxide, composite, mineral, alumina, zirconia, silica, silicon carbide, boron nitride, titanium dioxide, quartz, kaolin, nylon, polyethylene, polystyrene, polypropylene, polyvinyl chloride, polycarbonate, polyethylene terephthalate, cyclodextrin polymers, ion exchange resins, magnesium oxide, zinc oxide, calcium oxide, iron oxides, limestone, calcite, dolomite, bauxite, graphite, talc, mica, gypsum, barite, graphene, carbon black, charcoal, chitin, lignin, cellulose or cellulosic materials, chloride salts, phosphate salts, carbonate salts, sulfate salts, nitrate salts, and combinations thereof.

18. The method of claim 17, wherein the solid comprises silica.

19. The method of claim 1, wherein the solid comprising PFAS is provided by concentrating PFAS from a spent regenerant used in the regeneration of PFAS-laden spent adsorbents.

20. The method of claim 19, wherein PFAS obtained from concentrating a PFAS-containing spent regenerant used in the regeneration of PFAS-laden spent adsorbents is adsorbed onto a solid.

21. The method of claim 20, wherein the solid is selected from the group consisting of a ceramic, polymer, oxide, composite, mineral, alumina, zirconia, silica, silicon carbide, boron nitride, titanium dioxide, quartz, kaolin, nylon, polyethylene, polystyrene, polypropylene, polyvinyl chloride, polycarbonate, polyethylene terephthalate, cyclodextrin polymers, ion exchange resins, magnesium oxide, zinc oxide, calcium oxide, iron oxides, limestone, calcite, dolomite, bauxite, graphite, talc, mica, gypsum, barite, graphene, carbon black, charcoal, chitin, lignin, cellulose or cellulosic materials, chloride salts, phosphate salts, carbonate salts, sulfate salts, nitrate salts, and combinations thereof.

* * * * *